United States Patent
Ahn et al.

(10) Patent No.: US 9,006,948 B2
(45) Date of Patent: Apr. 14, 2015

(54) HYBRID POLE BEARINGLESS SRM

(75) Inventors: Jin Woo Ahn, Busan (KR); Dong Hee Lee, Busan (KR); Huijun Wang, Beijing (CN)

(73) Assignee: Kyungsung University Industry Cooperation Foundation, Busan (KR)

( * ) Notice: Subject to any disclaimer, the term of this patent is extended or adjusted under 35 U.S.C. 154(b) by 455 days.

(21) Appl. No.: 13/322,555

(22) PCT Filed: Jul. 14, 2009

(86) PCT No.: PCT/KR2009/003844
§ 371 (c)(1), (2), (4) Date: Nov. 26, 2011

(87) PCT Pub. No.: WO2010/137766
PCT Pub. Date: Dec. 2, 2010

(65) Prior Publication Data
US 2012/0068558 A1    Mar. 22, 2012

(30) Foreign Application Priority Data
May 28, 2009    (KR) .................. 10-2009-0047080

(51) Int. Cl.
H02K 7/09    (2006.01)
H02K 19/06    (2006.01)
H02K 19/10    (2006.01)

(52) U.S. Cl.
CPC ............... *H02K 7/09* (2013.01); *H02K 19/103* (2013.01)

(58) Field of Classification Search
CPC ............ H02K 3/16; H02K 3/20; H02K 7/09; H02K 11/0015; H02K 11/0021; H02K 19/103; H02K 37/02; H02K 37/04; F16C 32/0497
USPC ........................................................ 310/90.5
See application file for complete search history.

(56) References Cited

U.S. PATENT DOCUMENTS 5,880,549 A * 3/1999 Chiba et al. .................. 310/168
6,727,618 B1 * 4/2004 Morrison ..................... 310/90.5

FOREIGN PATENT DOCUMENTS

| JP | 08163847 A | 6/1996 |
| JP | 2000217394 A | 8/2000 |
| KR | 1020020046087 A | 6/2002 |

* cited by examiner

*Primary Examiner* — Quyen Leung
*Assistant Examiner* — Eric Johnson
(74) *Attorney, Agent, or Firm* — Novick, Kim & Lee, PLLC; Jae Youn Kim

(57) ABSTRACT

Disclosed is a hybrid pole bearingless switched reluctance motor (BLSRM). The BLSRM includes a stator provided with windings, a rotor rotating about an axis when current is conducted to the windings. The rotor includes a plurality of rotor poles extending radially outward, and the stator includes a plurality of stator poles extending radially inward. The windings include suspending windings to generate radial force for the rotor and torque windings to generate torque. The suspending windings are mutually separated from the torque windings. Through the use of the hybrid pole BLSRM, a stator pole generating the radial force can be controlled independently from the stator pole generating the torque by separately arranging the stator pole generating the radial force and the stator pole generating torque based on the analysis of radial force and torque characteristics according to the position of the stator poles.

3 Claims, 6 Drawing Sheets

HYBRID POLE BEARINGLESS SRM

TECHNICAL FIELD

The present invention relates to a hybrid pole bearingless switched reluctance motor (BLSRM) in which a pole generating suspending force for a rotor is separated from a torque pole and, more particularly, to a hybrid pole BLSRM capable of controlling a stator pole generating radial force for a rotor independently from a stator pole generating torque by separately arranging the stator pole generating the radial force and the stator pole generating the torque.

BACKGROUND ART

Recently, the demand for a special electric motor has been greatly increased in automobiles, medical equipment, bio-related industry, semiconductor devices, aerospace fields, and military fields. Especially, the demand for bearingless electric motors has been more greatly increased in application fields (e.g., a grinder of a machine tool and a turbo molecular pump) requiring an ultra-high speed rotation and medical equipment fields (e.g., a blood pump and a bio-pump) to which a mechanical bearing is not adaptable. Different from a support structure of a mechanical bearing in a typical electric motor, a bearingless electric motor simultaneously generates driving torque and radial force used for suspending a rotor through a uniform air-gap. The radial force is used to provide the uniform air-gap by controlling magnetic flux generated from stator windings without a bearing used in the typical electric motor. Different from an existing air bearing or magnetic bearing system, the bearingless electric motor is designed such that the radial force is generated from the stator winding. Accordingly, since the bearingless electric motor does not require an additional space to install a magnetic bearing or an air bearing, the size of the electric motor can be reduced, and a system can be simplified. Therefore, the bearingless electric motor has a significant economical advantage.

FIG. 1 is a view showing the structure of a conventional bearingless switched reluctance motor (BLSRM) equipped with torque windings and windings generating suspending force for a rotor of a phase.

An SRM rotates a rotor by using reluctance torque according to the variation of magnetic reluctance. The SRM is manufactured at a low cost, and the maintenance of the SRM is rarely required. In addition, since the SRM is operated with high reliability, the life time of SRM may be nearly permanent.

As shown in FIG. 1, a reference character $N_{ma}$ represents a main winding of a phase A to generate rotational torque, and reference characters $N_{sa1}$ and $N_{sa2}$ represent auxiliary windings of the phase A to generate radial force. As shown in FIG. 1, the main winding $N_{ma}$ is constructed by connecting four coils in series, and the auxiliary windings $N_{sa1}$ and $N_{sa2}$ are constructed by winding two coils in series, respectively. In the case of phases B and C, main windings and auxiliary windings are wound and arranged similarly to the phase A. As shown in FIG. 1, a bolded solid line represents a magnetic flux of each pole, which is generated by current flowing through the main winding, and a dashed line represents leakage flux generated by current $i_{ma}$ flowing through the auxiliary winding $N_{sa1}$. The resultant flux generated by the current of the main winding and the auxiliary winding is increased in the Air-gap1, and decreased in the Air-gap 2.

Radial force in an α-direction may be generated due to difference in the resultant flux of each air-gap. Similarly, radial force in a β-direction may be generated due to resultant flux of the current $i_{ma}$ and current $i_{sa2}$ flowing through the auxiliary winding $N_{sa2}$. The direction of such radial force for the rotor may be uniformly maintained by controlling the intensity and direction of current flowing through the auxiliary windings according to positions of the rotor.

However, in the BLSRM of FIG. 1, since magnetic flux to generate torque mutually interacts with magnetic flux to generate magnetic levitation force, the control of the two kinds of magnetic flux is difficult.

FIG. 2 is a graph showing the characteristics of torque and suspending force for a rotor in the typical BLSRM. A region to generate torque partially overlaps with a region to generate suspending force for the rotor in a pole structure for one phase due to the characteristics of the torque and the suspending force for the rotor in the typical BLSRM. In the overlap region, one of the torque and the suspending force for the rotor must be used.

Accordingly, since the use of the torque region is limited in order to generate stable suspending force for a rotor, torque ripples are increased, and operating efficiency is reduced.

As described above, the BLSRM has a simple mechanical structure and has no demagnetization characteristic of a permanent magnet for the radial force. On the contrary, since the conventional BLSRM has a configuration in which windings generating torque are arranged on stator poles together with windings generating radial force, significant interference may be caused between the windings generating the torque and the radial force.

In addition, since the radial force region overlaps with the torque region, the use of the torque region is limited in order to generate continuous radial force. Accordingly, the generation of constant torque may be difficult, and the efficiency may be largely reduced.

DISCLOSURE

Technical Problem

Accordingly, the present invention has been made to solve the above-mentioned problems occurring in the related art.

An object of the present invention is to provide a hybrid pole bearingless switched reluctance motor (BLSRM) capable of controlling a stator pole generating radial force independently from a stator pole generating torque by separately arranging the stator pole generating the radial force and the stator pole generating the torque.

Another object of the present invention is to provide a BLSRM, in which the number of switching devices to drive a system can be reduced.

Technical Solution

In order to accomplish the object of the present invention, it is one aspect of the present invention to provide a hybrid pole bearingless switched reluctance motor (BLSRM) including a stator provided with windings, a rotor rotating about an axis when current is conducted to the windings. The rotor includes a plurality of rotor poles extending radially outward, and the stator includes a plurality of stator poles extending radially inward. The windings include suspending windings to generate radial force for the rotor and torque windings to generate torque. The suspending windings are mutually separated from the torque windings.

In the hybrid pole BLSRM according to the present invention, the rotor includes 10 rotor poles, and the stator includes 8 stator poles $P_{x1}$, $P_{x2}$, $P_{x3}$, $P_{x4}$, $A_1$, $A_2$, $B_1$, and $B_2$.

In the hybrid pole BLSRM according to the present invention, the stator poles $P_{x1}$, $P_{x2}$, $P_{x3}$, and $P_{x4}$ are magnetic poles for the radial force, and the stator poles $A_1$, $A_2$, $B_1$, and $B_2$ are magnetic poles for the torque.

In the hybrid pole BLSRM according to the present invention, the stator poles $P_{x1}$ and $P_{x3}$ are magnetic poles for radial force in an α-direction representing a horizontal axis, the stator poles $P_{x2}$ and $P_{x4}$ are magnetic poles for radial force in a β-direction representing a vertical axis, the stator poles $P_{x1}$ and $P_{x3}$ are symmetrical to each other, and the stator poles $P_{x2}$ and $P_{x4}$ are symmetrical to each other.

In the hybrid pole BLSRM according to the present invention, each magnetic pole for the radial force has pole-arc corresponding to two times pole-arc of each rotor pole.

In the hybrid pole BLSRM according to the present invention, the hybrid pole BLSRM is a two-phase switched reluctance motor generating torque by winding current having phases A and B.

In the hybrid pole BLSRM according to the present invention, surficial areas of the stator poles $P_{x1}$, $P_{x2}$, $P_{x3}$, and $P_{x4}$ facing the rotor poles are greater than surficial areas of the stator poles $A_1$, $A_2$, $B_1$, and $B_2$.

Advantageous Effects

As described above, according to the hybrid pole bearingless switched reluctance motor (BLSRM) of the present invention, a stator pole generating radial force can be controlled independently from a stator pole generating torque by separately arranging the stator pole generating the radial force and the stator pole generating torque based on the analysis of radial force and torque characteristics according to the position of the stator poles.

According to the hybrid pole BLSRM of the present invention, in order to generate continuous torque and radial force for a rotor, pole-arc of a pole generating the radial force is determined by taking into consideration a pole structure of the rotor, so that the radial force and torque characteristics can be improved. Accordingly, when comparing with a conventional BLSRM, non-linearity can be significantly reduced. In addition, since currents of windings rarely interact with each other, the hybrid pole BLSRM has an advantage in control of the stator poles.

According to the hybrid pole BLSRM of the present invention, when comparing with the conventional BLSRM, since the interaction between torque and radial force is very weak, control operations can be independently performed, and a converter structure can be simplified.

BEST MODE

Mode for Invention

The objects and new features of the present invention will be apparent from the following description of the present invention and accompanying drawings.

Hereinafter, the concepts of a hybrid pole bearingless SRM (BLSRM) according to the present invention will be described.

The present invention suggests a BLSRM having a hybrid pole structure (hybrid pole BLSRM) capable of generating continuous torque and radial force. The hybrid pole BLSRM is designed such that a stator pole to generate torque is separated from a stator pole to generate suspending force for a rotor. A torque winding to generate torque and a winding to generate the suspending force for the rotor are separately mounted on the stator poles, respectively.

In order to stably and continuously generate the radial force of the rotor, pole-arc of the pole to generate the suspending force for the rotor is designed by taking into consideration a pole structure of the rotor. The pole-arc is designed such that poles are symmetrical to each other about an α-direction representing a horizontal axis and a β-direction representing a vertical axis.

Accordingly, two α-directional windings generate suspending force moving the rotor to the left or rightside in a horizontal direction according to current applied to the two windings, and current flowing through β-directional pole windings generates suspending force moving the rotor to the up or down side in a vertical direction. Stator poles between two-directional suspending poles are designed to generate main torque. However, the torque is actually generated by reluctance between rotor and stator poles positioned between the suspending poles.

The hybrid pole BLSRM according to the present invention makes less interaction between current generated from winding than that of a conventional BLSRM since the stator pole to generate the suspending force for the rotor is separated from the stator pole to generate torque. The hybrid pole BLSRM according to the present invention can generate continuous torque and radial force. In addition, the number of switching devices to drive a system can be reduced.

The validity of the hybrid pole BLSRM according to the present invention is verified through simulation results.

Hereinafter, the configuration of the present invention will be described with reference to accompanying drawings.

Figure 1:
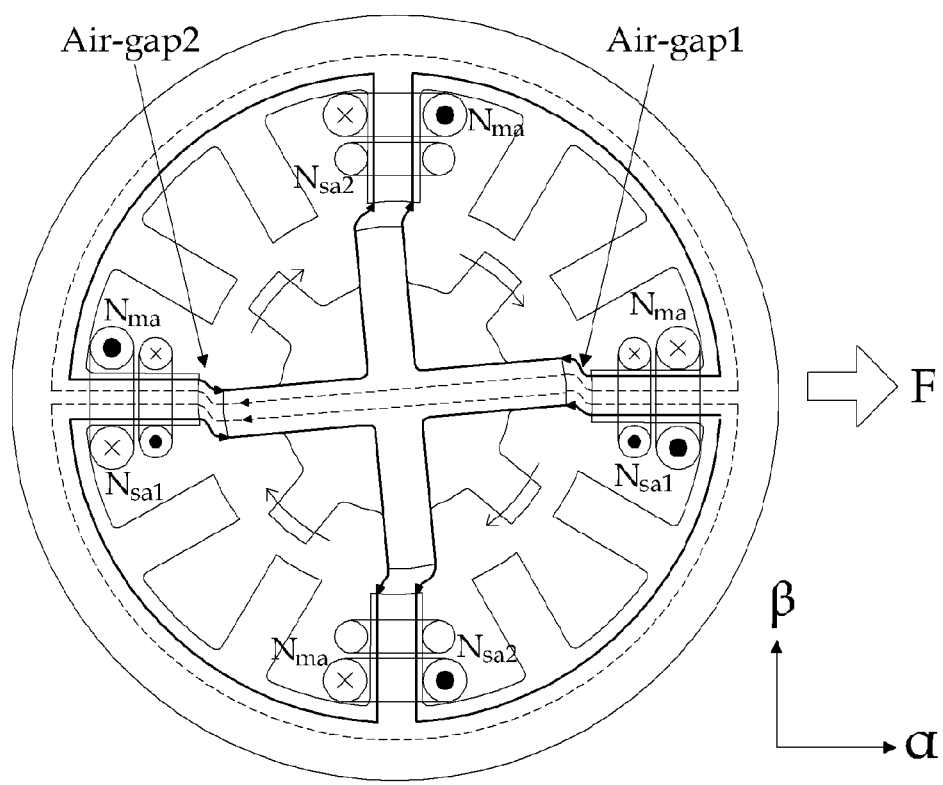
FIG. 1 is a view showing a typical bearingless SRM (BLSRM)
Figure 2:
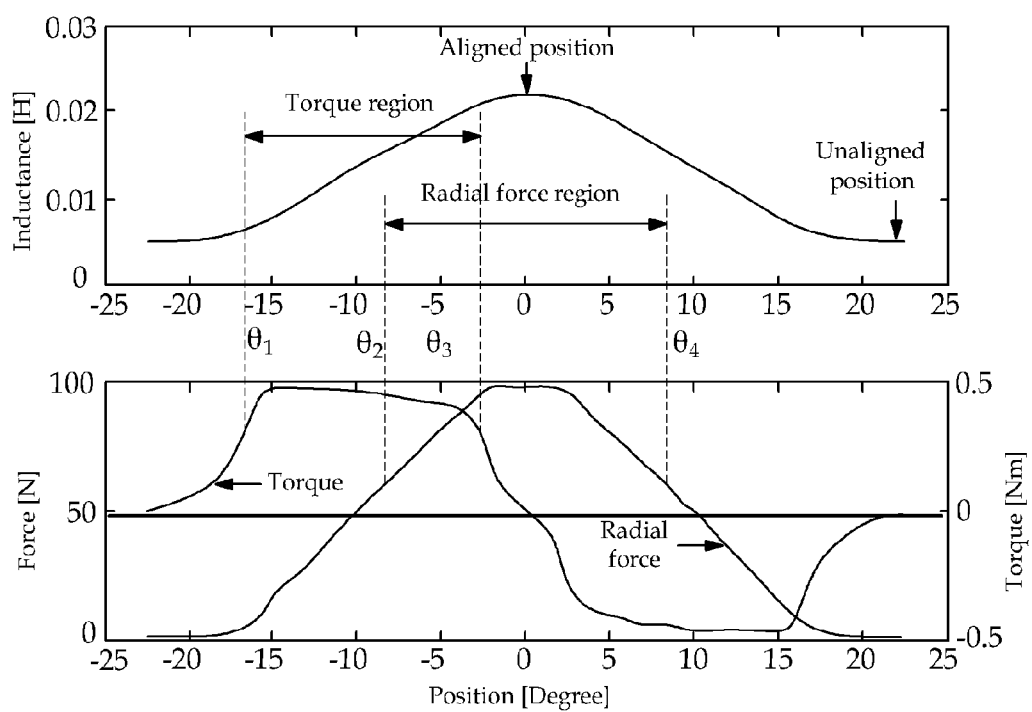
FIG. 2 is a graph showing torque and radial force characteristics in the typical BLSRM.
Figure 3:
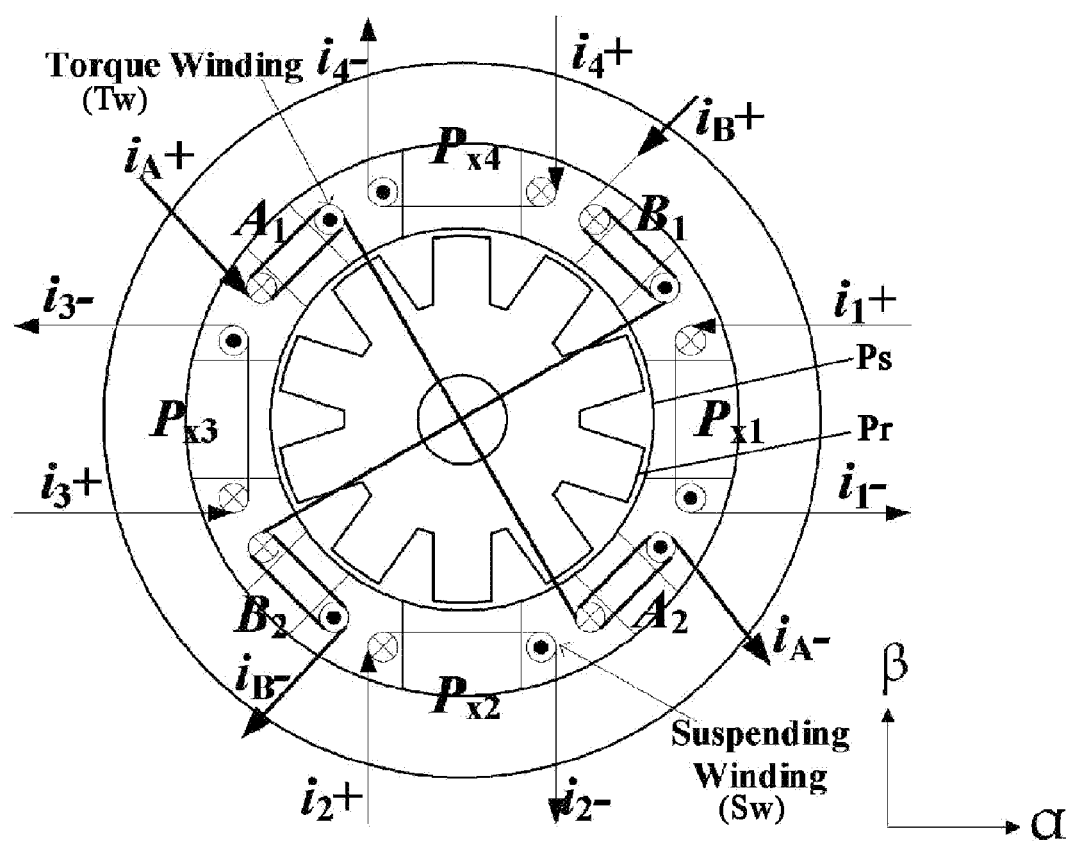
FIG. 3 is a view showing a hybrid pole BLSRM suggested in the present invention.
Figure 4:
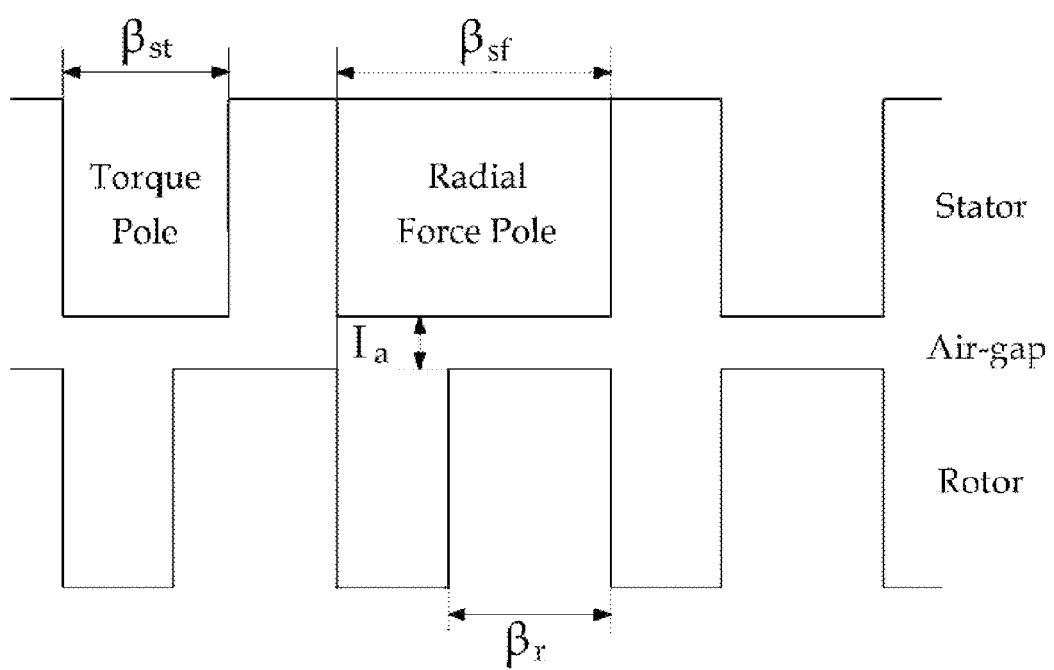
FIG. 4 is a view showing the hybrid structure of poles in the hybrid pole BLSRM according to the present invention and FIGS. 5 and 6 are views showing air-gap displacement in α- and β-directions and current state of axial windings in a stationary state and in an operation state at a constant rotational speed of 1,000 [rpm].

FIG. 3 is a view showing the structure of the hybrid pole BLSRM suggested in the present invention, and FIG. 4 is a view showing a hybrid pole structure of the BLSRM according to the present invention.

As shown in FIG. 3, the hybrid pole BLSRM according to the present invention includes a stator provided with windings and a rotor rotating about a rotational axis as soon as current is conducted to the windings. The rotor has a plurality of rotor poles extending radially outward, and the stator has a plurality of stator poles extending radially inward. The windings include suspending windings (Sw) generating the suspending force of the rotor and torque windings (Tw) generating torque.

As shown in FIG. 3, the suspending windings (Sw) are mutually separated from the torque windings (Tw).

The rotor employs 10 rotor poles, and the stator employs 8 stator poles. As shown in FIG. 3, stator poles PX1, PX2, PX3, and PX4 represent radial force poles, and stator poles A1, A2, B1, and B2 represent torque poles.

As shown in FIG. 3, the hybrid pole BLSRM has an 8/10 pole structure. In the structure, the stator poles PX1 and PX3 relate to suspending windings (Sw) generating radial force in the α-direction, and the stator poles PX2 and PX4 relate to suspending windings (Sw) generating radial force in the β-direction. The stator poles A1 and A2 relate to torque windings (Tw) with an phase A, and the stator poles B1 and B2 relate to torque windings (Tw) with a phase B.

In other words, the hybrid pole BLSRM according to the present invention is actually a 2-phase SRM to generate torque by current flowing through the torque windings (Tw) with the phases A and B. The suspending windings (Sw) related to the stator poles PX1, PX2, PX3, and PX4 generate the radial force for the rotor.

According to the present invention, since the suspending windings (Sw) generating the radial force for the rotor are mutually separated from the torque winding (Tw) generating the torque, the limitation of torque region in the conventional BLSRM can be overcome. In this case, the radial force for the rotor is generated through the interaction between the stator poles and the rotor poles. Therefore, in order to generate the continuous radial force for the rotor, the pole-arc (Pr) of the rotor must be considered.

The hybrid pole BLSRM according to the present invention is designed such that the pole-arc (Ps) of the stator poles generating the radial force for the rotor becomes a pole pitch of the rotor shown in FIG. 4 by analyzing the interaction between the stator poles and the rotor poles.

Accordingly, when the position of a rotor pole is completely away from the position of an α-directional stator pole after the position of the rotor pole has matched with the position of the stator pole due to the approach of the stator pole, a neighboring rotor pole approaches the stator pole. Therefore, a continuous magnetic circuit can be constructed.

In other words, as shown in FIG. 3, the stator poles $P_{x1}$ and $P_{x3}$ serve as magnetic poles for radial force in the α-direction that represents a horizontal axis, and the stator poles $P_{x2}$ and $P_{x4}$ serve as magnetic poles for radial force in the β-direction that represents a vertical axis. The stator poles $P_{x1}$ and $P_{x3}$ are symmetrical to each other, and the stator poles $P_{x2}$ and $P_{x4}$ are symmetrical to each other.

As shown in FIG. 4, an air-gap is formed between a rotor pole βr corresponding to the torque pole and a stator pole representing the radial force pole. As shown in FIG. 4, the surficial areas of the radial force stator poles Px1, PX2, PX3, and PX4 (βsf) facing the rotor poles βr are greater than the surficial areas of the torque stator poles A1, A2, B1, and B2 (βst).

Hereinafter, description will be made regarding a simulation performed with respect to a BLSRM prototype manufactured to verify the validity of the hybrid pole BLSRM according to the present invention.

Figure 5:
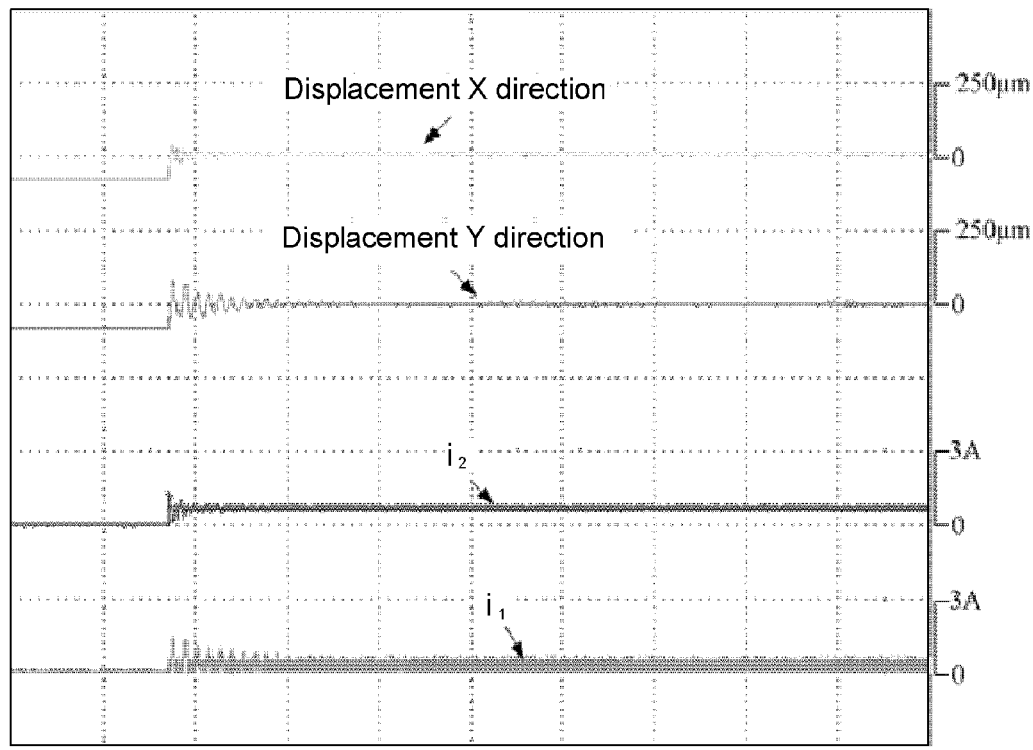
Figure 6:
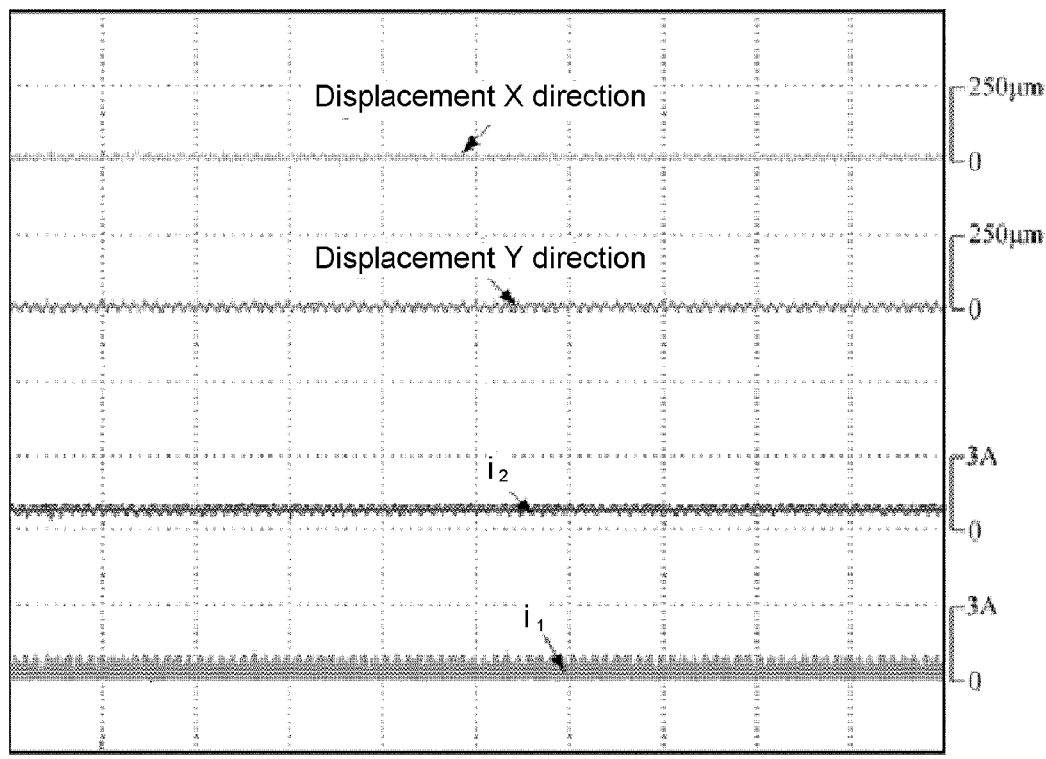

FIGS. 5 and 6 are views showing the current state of axial windings and air-gap displacement in α- and β-directions when the hybrid pole BLSRM according to the present invention is in a stationary state with a load of 0.6 kgf, and operates at a constant rotational speed of 1,000 [rpm] with the load of 0.6 kgf.

As shown in FIG. 5, in a state in which the load of 0.6 kgf is applied to the axis of the rotor, current is applied in order to place an air-gap at the central portion in the beginning. Accordingly, an air-gap error becomes approximately zero. Although the load of 0.6 kgf applied to the rotor acts as a non-linear factor in a rotational state, the air-gap is stably and uniformly controlled under a condition of a constant rotational speed of 1000 [rpm] as shown in FIG. 6.

Although an exemplary embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A hybrid pole bearingless switched reluctance motor (BLSRM) comprising:
    a stator provided with windings; and
    a rotor rotating about an axis when current is conducted to the windings,
    wherein the rotor includes a plurality of rotor poles extending radially outward, and the stator includes a plurality of stator poles extending radially inward,
    wherein the windings include suspending windings to generate radial force for the rotor and torque windings to generate torque,
    wherein the suspending windings are mutually separated from the torque windings,
    wherein the rotor includes ten rotor poles, and the stator includes eight stator poles,
    wherein the stator poles comprise four radial force stator poles which are magnetic poles for the radial force, and four torque stator poles which are magnetic poles for the torque,
    wherein the four radial force stator poles include two horizontal stator poles which are arranged in an α-direction representing a horizontal axis, and two vertical stator poles which are arranged in a β-direction representing a vertical axis,
    the two horizontal stator poles are symmetrical to each other, and
    the two vertical stator poles are symmetrical to each other, and
    wherein each of the four radial force stator poles has a pole-arc corresponding to two times a pole-arc of each of the ten rotor poles.

2. The hybrid pole BLSRM of claim 1, wherein the hybrid pole BLSRM is a two-phase switched reluctance motor generating torque by winding current having phase A and B.

3. The hybrid pole BLSRM of claim 2, wherein surficial areas of the four radial force stator poles facing the rotor poles are greater than surficial areas of the four torque stator poles.

* * * * *